May 29, 1956  C. T. HATCH ET AL  2,747,725
BELT TYPE CONVEYOR
Filed April 10, 1951  2 Sheets-Sheet 2
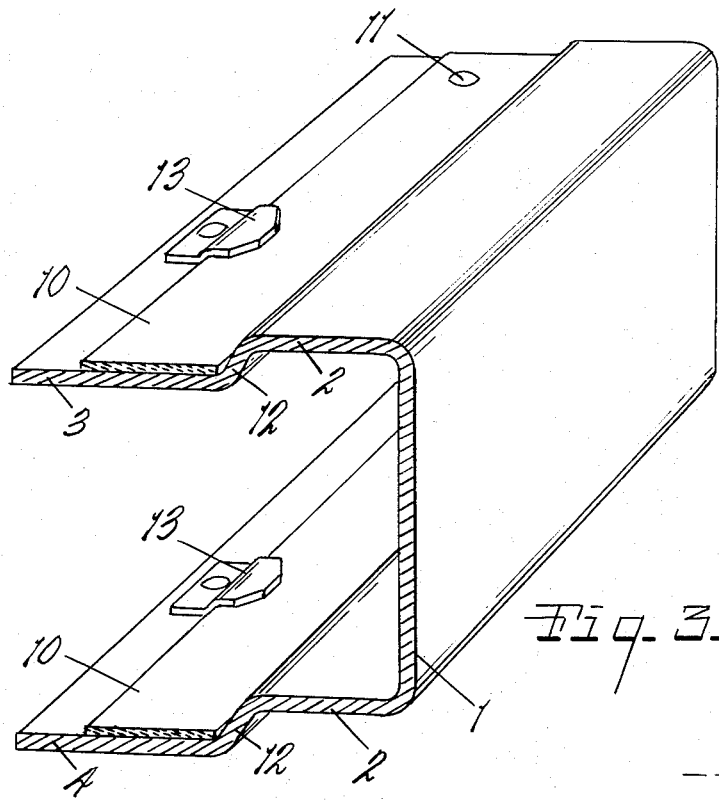
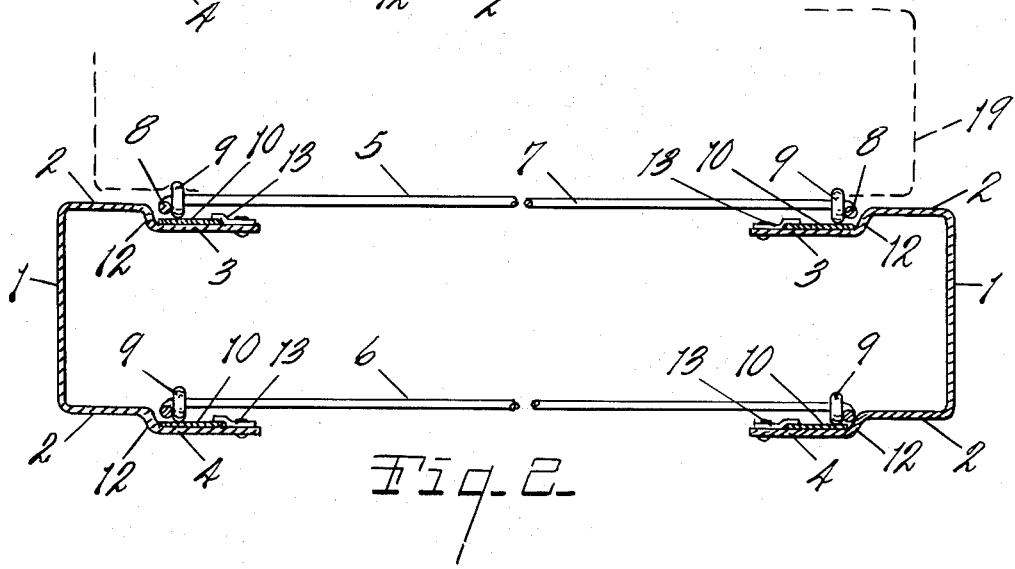
INVENTORS
Charles T. Hatch
Raymond H. Marshall
By Otto A. Earl
Attorney

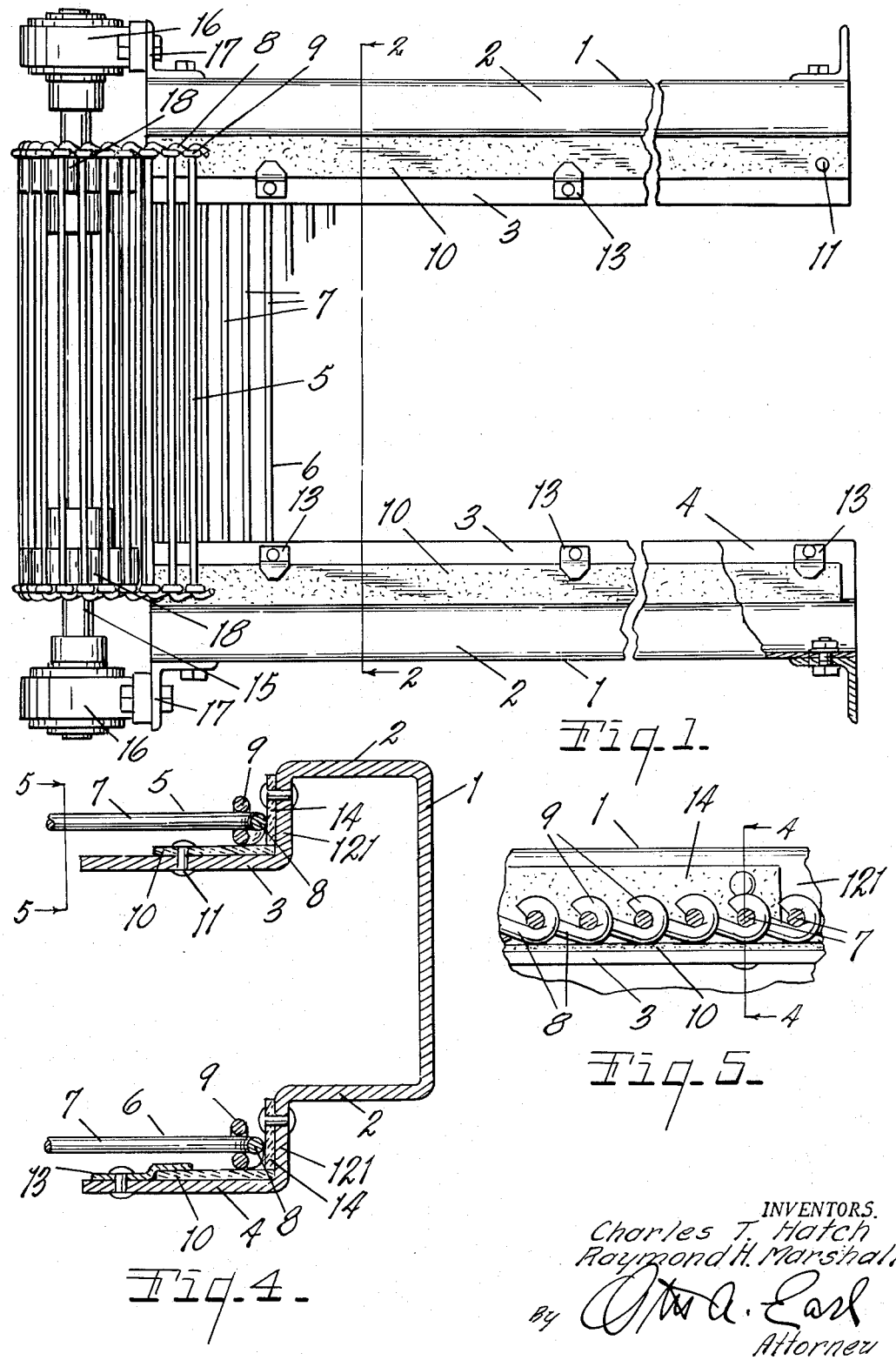

2,747,725
BELT TYPE CONVEYOR

Charles T. Hatch and Raymond H. Marshall, Albion, Mich., assignors to Union Steel Products Company, Albion, Mich.

Application April 10, 1951, Serial No. 220,192

7 Claims. (Cl. 198—195)

This invention relates to improvements in belt type conveyor.

The main objects of this invention are:

First, to provide a conveyor of the link belt type which is substantially noiseless and very durable.

Second, to provide a conveyor of this type which is easily kept in a sanitary condition thereby rendering it well adapted for use in bakeries, food factories and the like.

Objects relating to details and economies of the invention will appear from the description to follow. The invention is pointed out in the claims.

A preferred embodiment of the invention is illustrated in the accompanying drawing, in which:

Fig. 1 is a fragmentary plan view of a section of a conveyor embodying the features of our invention, the supporting frame not being fully illustrated and only the driven shaft with its pulleys being illustrated, the driving shaft for the conveyor belt not being illustrated.

Fig. 2 is a transverse section on a line corresponding to line 2—2 of Fig. 1, and the conveyor belt pulley supporting shaft pulleys and shaft bearings therefor being omitted.

Fig. 3 is an enlarged fragmetary perspective view of one of the rails in transverse section.

Fig. 4 is an enlarged fragmentary view of a modified form or embodiment of my invention taken on a line corresponding to line 4—4 of Fig. 5.

Fig. 5 is a fragmentary view in longitudinal section on a line corresponding to line 5—5 of Fig. 4.

The embodiment of our invention illustrated is especially designed for use in bakeries, food factories and the like where conveyors are employed, frequently of very considerable length. We have illustrated only one end conveyor way section and it will be understood that in long conveyors, other way sections are disposed in supported end to end relation, the way sections commercially may desirably be about ten feet in length.

Each way section comprises a pair of spaced parallel side rails 1 of channel section and disposed in opposed inwardly facing relation. The arms 2 of the rails 1 are conformed to provide upwardly facing angular ways 3 and 4, the way 3 being adapted to support the top or forwardly travelling reach 5 of the conveyor belt while the lower way 4 supports the rearward travelling or lower reach 6 of the conveyor belt.

The conveyor belt comprises a plurality of spaced parallel rods 7 having links 8 at the ends thereof terminating in eyes 9 which embrace the adjacent rods. The eyes constitute the bearing elements which are slidable upon the ways as the belt is translated upon the ways. The eyes of this type of belt conveyor are subject to a great amount of wear and it is objectionable to lubricate the ways to minimize wear, particularly in bakeries and food factories. To eliminate wear and noise, we provide the ways with bearing strips 10 of nonmetallic material, extruded nylon being highly satisfactory for the purpose. These bearing strips are fixedly secured or anchored to the ways at one end as by means of the rivet 11 with their inner edges abutting the upright side thrust guide portions 12 of the ways. The bearing strips are retained upon the ways by means of the angled clips 13 which engage the outer edges of the strips and overlap them, this permitting the expansion and contraction of the bearing strips under varying atmospheric conditions which conditions usually vary widely in bakeries and food factories. The rivets 11 are arranged at the forward ends of the strips, that is, their forward ends relative to the direction of travel of the belt upon the ways.

In the embodiment of my invention shown in Figs. 4 and 5, the angled or thrust portions 121 of the ways are provided with edge thrust strips 14 of nonmetallic material which are disposed in spaced relation on the upright portions 121 of the ways to receive the end thrust of the conveyor belt.

These nonmetallic bearing strips, nylon being preferred, eliminate noise and substantially eliminate wear on the conveyor belt. Further, the power required to drive the conveyor belt is greatly reduced. The applicants have found that the electrical input to the motor is approximately 50% less as compared to structures heretofore used, and since a good deal of the input is consumed in friction through the speed reduction gearing, it appears that the friction of the belt on the ways is as a result of the use of these bearing strips reduced in a larger proportion. In practice, the applicants have been able to change the length of the maximum drive unit from 40' to 60' without developing as much tension on the belt as was formerly developed in a 40' length. This results in greatly reducing the wear on the belt and, as stated, eliminates noise such as resulted when the belt was translated in contact with the ways.

In the accompanying drawing, we illustrate the driven shaft 15 at one end of the conveyor, this being supported by bearings 16 on frame uprights indicated at 17. The shaft is provided with supporting pulleys 18 for the belt. The drive is not illustrated as it forms no part of this invention.

The embodiment of our invention in Figs. 1, 2 and 3 permits the loaf or other article conveyed at 19 in Fig. 2 to project beyond at the edges of the conveyor belt, the angles 12 of the way being of a height less than the top of the conveyor belt as shown in Fig. 2.

The embodiment shown in Figs. 4 and 5 has the advantage of providing means for effectively supporting the end thrust member 14.

We have illustrated and described our invention in a highly commercial embodiment thereof. We have not attempted to illustrate or describe other embodiments or adaptations as we believe this disclosure will enable those skilled in the art to embody or adapt our invention as may be desired.

Having thus described our invention, what we claim as new and desire to secure by Letters Patent is:

1. In a conveyor, the combination of spaced parallel side rails of inwardly facing channel section providing inwardly projecting arms, the arms of the side rails terminating in integral upwardly facing upper and lower angled ways, a conveyor belt comprising a plurality of spaced parallel rods having links at the ends thereof terminating in eyes embracing the adjacent rods, the eyes constituting bearing elements slidable upon the ways as the belt is translated upon the ways, elongated bearing strips of nylon disposed upon the supporting surfaces of the ways, one end of the strips being secured to the ways, spaced clips on the ways engaging the outer edges of the bearing strips and overlapping the same while permitting expansion and contraction thereof from their ends attached to the ways, said clips being positioned rearwardly of said securing means relative to the direction of travel of the reaches of the belt on the ways, and thrust strips of nylon secured at spaced intervals to the upright portions of the ways to receive the edge thrust of the belt.

2. In a conveyor, the combination of spaced parallel side rails of inwardly facing channel section providing inwardly projecting arms, the arms of the side rails terminating in integral upwardly facing upper and lower ways, a conveyor belt comprising a plurality of spaced parallel rods having links at the ends thereof terminating in eyes embracing the adjacent rods, the eyes constituting bearing elements slidable upon the ways as the belt is translated upon the ways, elongated bearing strips of nylon disposed upon the supporting surfaces of the ways, one end of the strips being secured to the ways, spaced clips on the ways engaging the outer edges of the bearing strips and overlapping the same while permitting expansion and contraction thereof from their ends attached to the ways, said clips being positioned rearwardly of said securing means relative to the direction of travel of the reaches of the belt on the ways.

3. In a conveyor, the combination of spaced parallel side rails of inwardly facing channel section providing inwardly projecting arms, the arms of the side rails having upwardly facing upper and lower angled ways, a conveyor belt elongated bearing strips of nonmetallic material disposed upon the supporting surfaces of the ways, said bearing strips being fixedly secured to the ways at one end only, spaced clips overhanging the outer edges of the bearing strips while permitting expansion and contraction thereof from their ends attached to the ways, and nonmetallic thrust bearing members disposed on the side portions of the ways to receive the edge thrust of the belt.

4. In a conveyor, the combination of spaced parallel side rails of inwardly facing channel section providing inwardly projecting arms, the arms of the side rails constituting upwardly facing upper and lower ways, a conveyor belt, elongated bearing strips of nonmetallic material disposed upon the belt supporting surfaces of the ways, said bearing strips being fixedly secured to the ways at one end only, and spaced clips overhanging the outer edges of the bearing strips while permitting expansion and contraction thereof from their ends attached to the ways.

5. In a conveyor, the combination of supporting ways, a conveor belt having metal bearing elements slidable upon the ways as the belt is translated upon the ways, elongated bearing strips of nonmetallic material disposed upon the ways to slidably support said bearing elements of the belt, said strip being secured at one end thereof to permit the expansion and contraction of the strip on the ways from their secured ends, said strips being free to elongate from the secured ends thereof in the direction of travel of the belt thereover, means engaging the bearing strips for retaining them upon the ways while permitting expansion and contraction thereof from their ends attached to the ways, and thrust members of nonmetallic material disposed on the ways to receive the edge thrust of the belt.

6. In a conveyor, the combination of supporting ways, a conveyor belt having metal bearing elements slidable upon the ways as the belt is translated upon the ways, elongated bearing strips of nonmetallic material disposed upon the ways to slidably support said bearing elements of the belt, said strips being secured at one end thereof to permit the expansion and contraction of the strips on the ways from their secured ends, said strips being free to elongate from the secured ends thereof in the direction of travel of the belt thereover, and means engaging the bearing strips for retaining them upon the ways while permitting expansion and contraction thereof from their ends attached to the ways.

7. In a conveyor, the combination of a relatively rigid way, a conveyor belt disposed to travel along said way, and an elongated non-metallic bearing strip disposed on the way to slidably support the belt as the same travels along the way, said strip being relatively flexible as compared to the flexibility of the way and being secured to the way at the forward end only of the strip relative to the direction of travel of the belt over the strip to permit the strip to expand and contract from said forward end hereof and to permit the same to elongate in the direction of the travel of the belt over the strip.

References Cited in the file of this patent

UNITED STATES PATENTS

| | | |
|---|---|---|
| D. 126,195 | Cohen | Apr. 1, 1941 |
| 1,082,908 | Read | Dec. 30, 1913 |
| 1,556,562 | Roddy | Oct. 6, 1925 |
| 1,851,380 | Briggs | Mar. 29, 1932 |
| 1,985,535 | De Wahl | Dec. 25, 1934 |
| 2,246,086 | Austin | June 17, 1941 |
| 2,459,598 | Stott | Jan. 18, 1949 |
| 2,675,283 | Thomson | Apr. 13, 1954 |